Oct. 15, 1946.　　　W. R. DICKSON　　　2,409,346
MATERIAL HANDLING MECHANISM
Filed Feb. 23, 1945　　　3 Sheets-Sheet 1
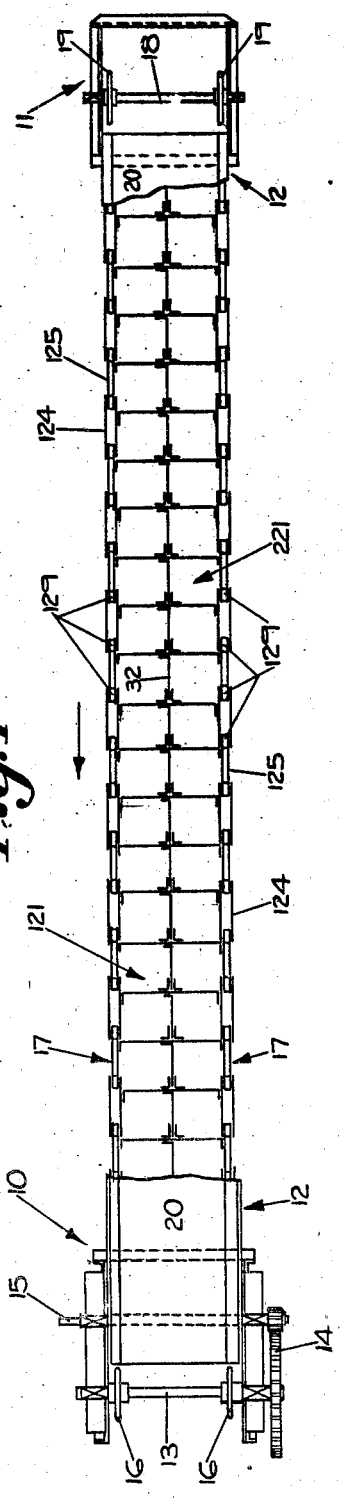
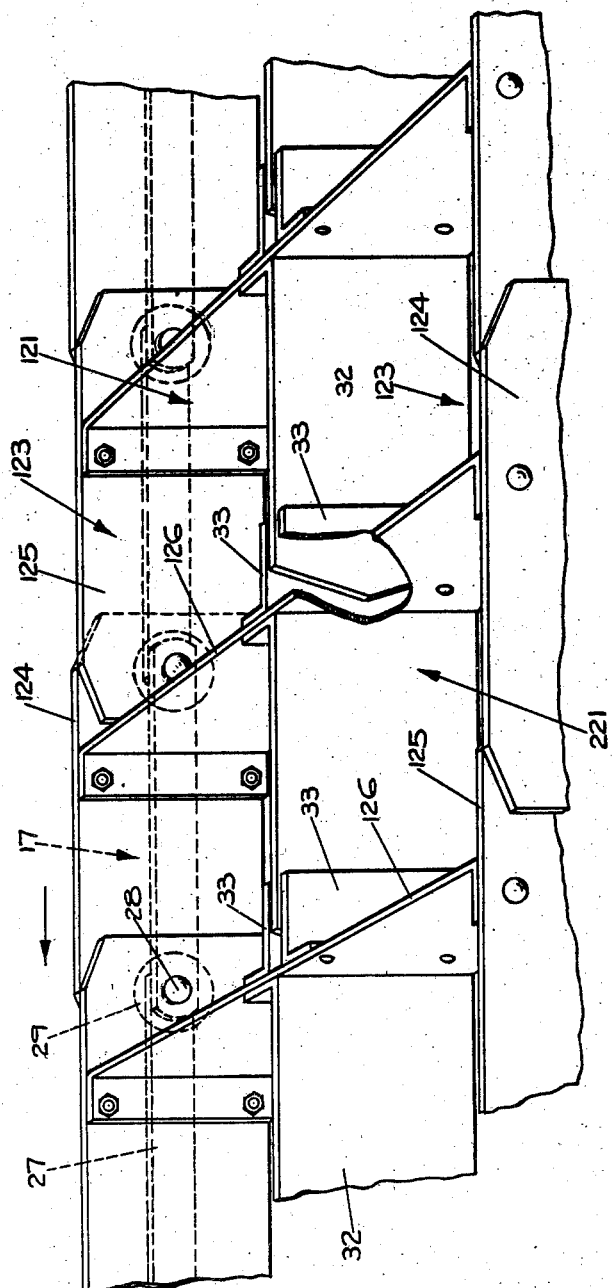
INVENTOR;
WILBUR R. DICKSON,
BY
ATT'Y.

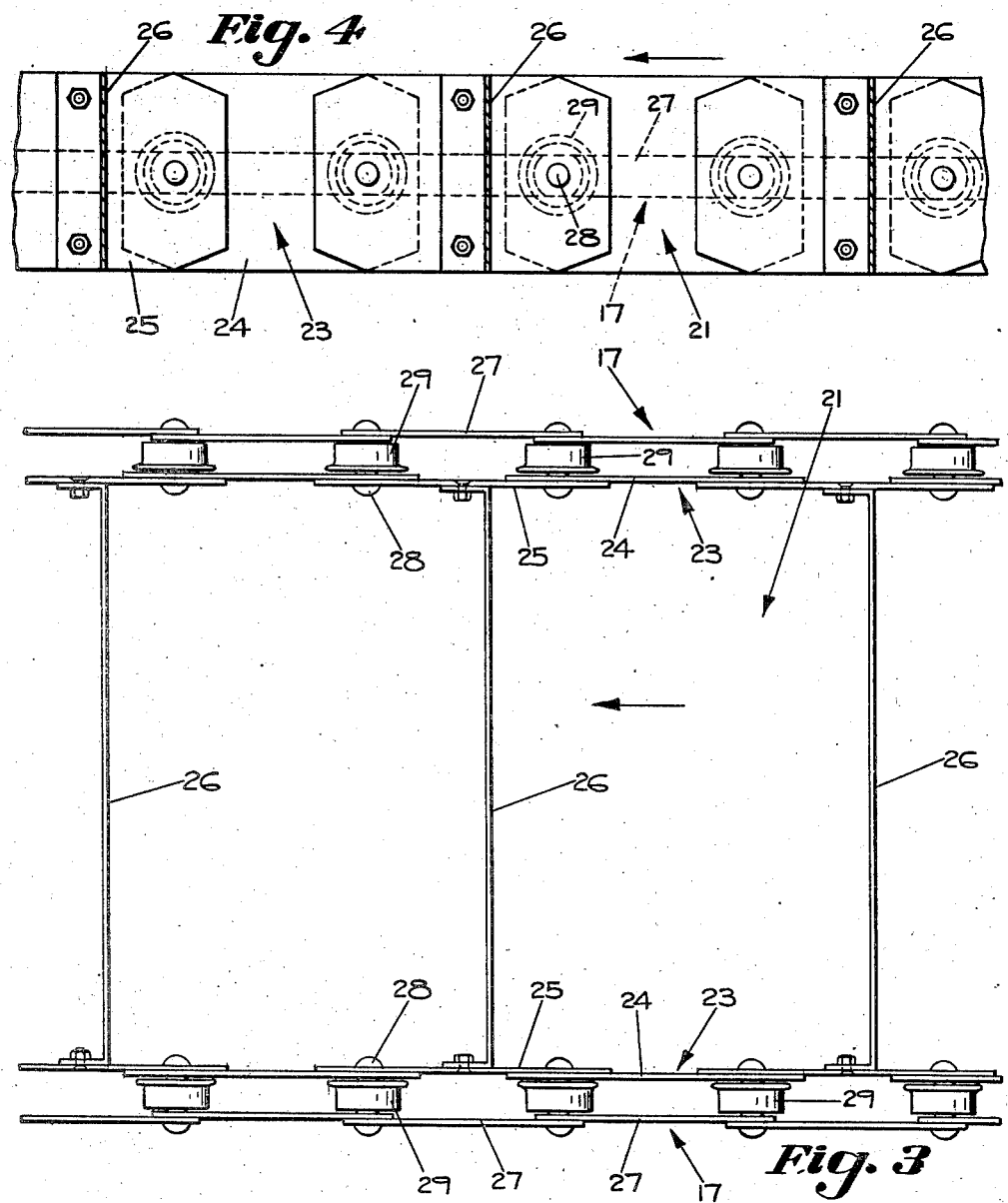
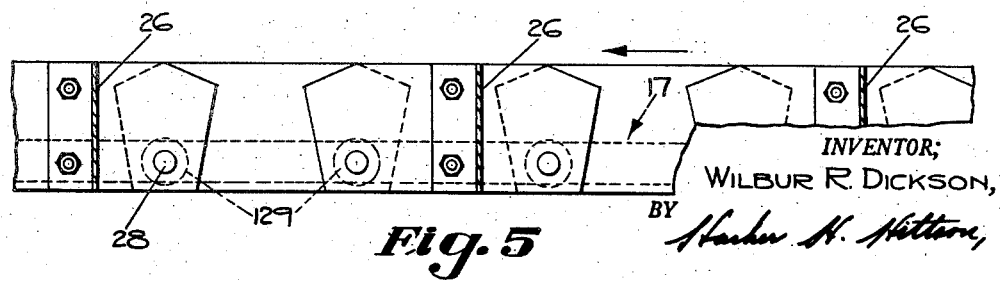

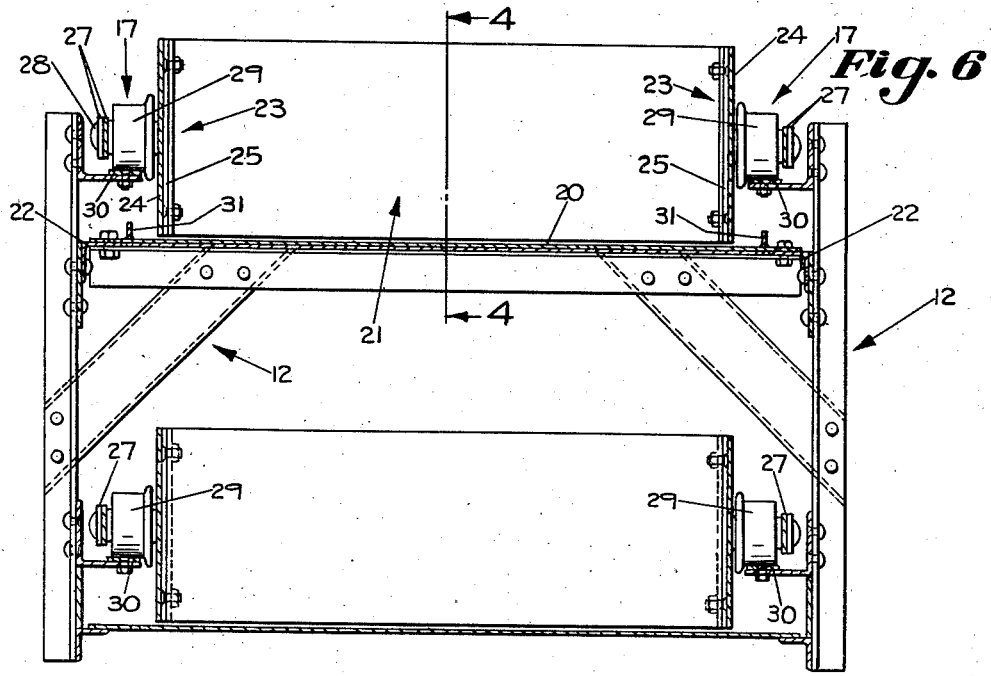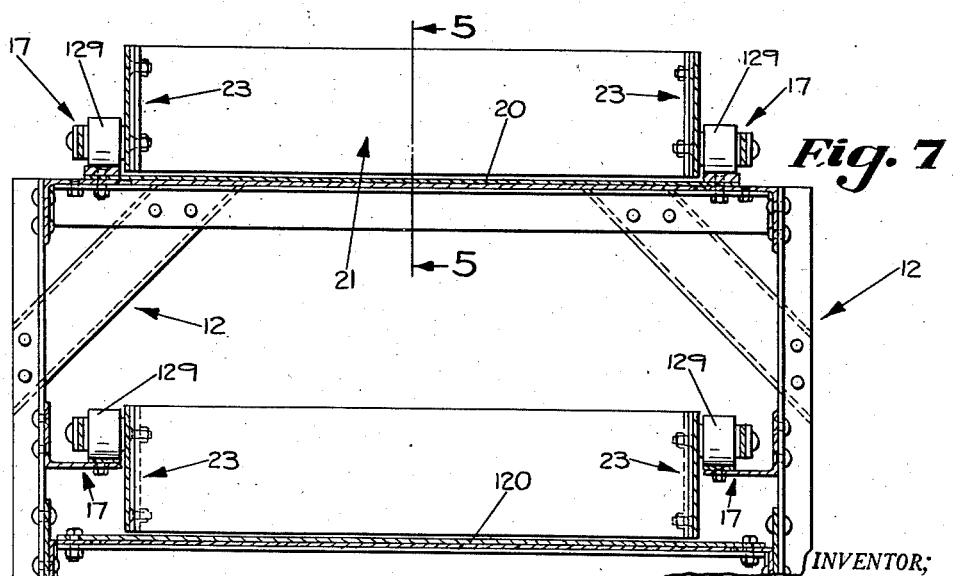

Patented Oct. 15, 1946

2,409,346

UNITED STATES PATENT OFFICE 2,409,346

MATERIAL HANDLING MECHANISM

Wilbur R. Dickson, Columbus, Ohio, assignor, by mesne assignments, to The Jeffrey Manufacturing Company, a corporation of Ohio Application February 23, 1945, Serial No. 579,328

13 Claims. (Cl. 198—168)

1

This invention relates to material handling mechanism and more specifically a scraper type conveyor.

An object of the invention is to provide an improved scraper type conveyor in which the material conveying trough includes rectilinearly or longitudinally movable articulated side plates which may form side bars of a conveyor chain, which side plates are movable over a stationary bottom plate.

A further object of the invention is to provide a scraper type conveyor in which a trough of a single or plurality of sections is provided, which is formed of a stationary bottom and rectilinearly or longitudinally movable side plates preferably also having transversely extending flights, which side plates confine material being conveyed and, together with the flights, are movable rectilinearly or longitudinally over a bottom plate.

A further object of the invention is to provide a conveyor of the above-mentioned type in which the movable side walls of the trough are supported, as by rails and rollers, or otherwise, off but close to the stationary bottom.

Other objects of the invention will appear hereinafter, the novel features and combinations being set forth in the appended claims.

In the accompanying drawings,

Fig. 1 is a fragmentary and diagrammatic illustration of a conveyor incorporating the features of my invention;

Fig. 2 is a perspective view, with parts in section, showing the side wall and flight construction of an embodiment of my invention, which provides a multiple compartment or trough type of conveyor, the bottom plate not being illustrated in this view;

Fig. 3 is a plan view showing a single compartment or trough type of conveyor in which the framework and bottom plate of the trough are not illustrated;

Fig. 4 is a sectional view of the mechanism of Fig. 3 and taken on the line 4—4 of Fig. 6, with the framework and bottom plate not shown;

Fig. 5 is a view, similar to Fig. 4, of a modified form of conveyor and taken on the line 5—5 of Fig. 7;

Fig. 6 is a transverse sectional view showing the framework and bottom plate and associated conveyor mechanism of the conveyor shown in part in Figs. 3 and 4 of the drawings; and Fig. 7 is a view, similar to Fig. 6, of a modified form of structure illustrated in part in Fig. 5 of the drawings.

2

In Fig. 1 of the drawings I have illustrated quite diagrammatically and fragmentarily, a conveyor which incorporates features of my invention in one embodiment thereof and particularly an embodiment which includes a plurality of compartments or parallel troughways, but it is to be distinctly understood that the general construction of the conveyor of Fig. 1 will be followed in the modifications shown in the other views of the drawings.

Said conveyor includes a head section 10 and a foot section 11 which are connected together by a framework 12 which extends between them. The head section 10 includes a driving head shaft 13 which is driven through reduction gearing 14 from a drive shaft 15 which may be driven by any desired form of motor, such as an electric motor, not illustrated.

The head shaft 13 is provided with drive sprockets 16 which drive a pair of endless chains 17, 17, which are laterally spaced and which are carried upon the framework 12, as described more completely hereinafter. The foot section 11 includes foot shaft 18 and foot sprockets 19 which receive and guide the spaced endless chains 17.

Before describing in detail the structure of the particular modification which is diagrammatically illustrated in Fig. 1 of the drawings and illustrated more in detail in Fig. 2 of the drawings, attention is directed to Figs. 3, 4 and 6 which disclose in detail a more simple form of conveyor embodying my invention.

Referring first to Fig. 6 of the drawings, it will be noted that the framework 12 is built up of usual longitudinally extending angle members which are interconnected by upstanding angles as well as diagonal angles, channels or plates, to provide a fairly rigid supporting structure. Adjacent the top of the framework 12 and extending longitudinally from the head section 10 to the foot section 11, is a bottom member or plate 20 which forms the bottom of a trough or way adapted to receive the material which is to be conveyed by the conveyor. Material in traveling from the foot section 11 to the head or discharge section 10, will be scraped over the bottom plate 20 of said trough, which trough is designated generally by the reference character 21.

As best illustrated in Fig. 6 of the drawings, the bottom member or plate 20 is removably supported on its opposite sides or edges from the framework 12 by means of longitudinally extending angles 22 which in fact constitute a part of said framework 12. Nuts and bolts provide for the removable attachment of said plate 20 to said angles 22, thus providing for ready removal and renewal thereof, should said plates become worn in use.

As also clearly illustrated in Fig. 6, co-operating with and spaced above the bottom plate 20, is a pair of laterally spaced longitudinally or rectilinearly extending side plates 23, 23 forming the side walls of said material conveying trough 21. Each of the side walls 23 is formed of a plurality of upwardly and longitudinally extending articulated overlapping plates 24 and 25, the outermost plates being designated 24 and the innermost being designated 25.

Extending between transversely aligned or opposite side plates 25 and rigidly but preferably removably connected thereto, are transversely extending flights 26 which preferably have the same height as the side plates 24 and 25. The ends of the flights 26 are preferably bent over, as clearly illustrated in Figs. 3 and 4 of the drawings, and are bolted or otherwise connected to pairs of opposite plates 25.

The side plates 24 and 25 not only act to provide the articulated side walls of the trough 21, but, in addition, they preferably also act as side bars or side straps of the endless articulated chains 17, as best seen by reference to Fig. 3 of the drawings. Each of the chains 17 also includes overlapping outer side bars or side straps or plates 27, and each link of the chain is thus formed by a side bar or plate 27 and a side plate 24 or 25. The side bars or straps 27 have a much less height than the side plates 24 and 25, as clearly illustrated by reference to Figs. 4 and 6 of the drawings.

The links of each of the chains 17 also include spaced pivot pins 28 which pivotally connect two overlapping side bars or straps 27 and overlapping side plates 24 and 25, thereby providing for the articulate character of the side walls or plates 23, as above described. Furthermore, the chains 17 are preferably of the roller type in the most complete aspect of my invention, though, in broader aspects, they need not be of this type. To this end, the pivot pins 28 are provided with flanged rollers 29 which are adapted to ride on longitudinally extending rails 30 which are preferably renewable in character and are supported on angle members attached to and forming part of the framework 12, as clearly illustrated in Fig. 6 of the drawings.

It is also to be noted, particularly by reference to said Fig. 6, that the rollers 29 preferably support the bottoms of the articulated side plates or walls 23, off, but close to the bottom plate 20, to the end that there will be no frictional contact between said side plates 23 and the bottom plate 20, while at the same time preventing any undesirable leakage of material from under the bottoms of said side plates 23. To aid in preventing this undesired leakage, it is to be noted, particularly by reference to Fig. 6, that the bottom plate 20 extends laterally an appreciable amount, for example, two or three inches, beyond the side walls 23. In addition, if desired, upright baffle plates 31 may be provided on the bottom plates 20 spaced laterally from the side plates 23 and preferably out of frictional contact therewith.

It may be mentioned that in case drainage of the material being conveyed is desired, this conveyor is particularly adapted for such use, since the water can drain off through the space between the bottoms of the side walls 23 and the plate 20. If this is desired, the baffle plates 31 may be eliminated, or their ends may be spaced apart.

It is also to be noted by reference to Fig. 6, that the upper run of the conveyor is the only working run and in this illustration there is no bottom or trough forming plate on the return run of the conveyor, comparable to the plate 20. If it is desired, however, to employ the return run as a working run, this can be done by the simple expedient of providing a bottom forming plate adjacent the bottom run of the side plates 23, comparable to the plate 20. Such an arrangement is illustrated in the modification disclosed in Fig. 7 of the drawings.

It is evident, particularly by reference to Figs. 3 and 4 of the drawings, that the side plates or walls 23 are articulated about horizontal axes, thus providing for travel of the conveyor mechanism about the head shaft 13 and the foot shaft 18.

In the modification illustrated in Figs. 5 and 7 of the drawings, it is evident that the arrangement is fundamentally similar to that above described, particularly in connection with Figs. 3, 4 and 6. The principal differences will now be described.

First of all, the conveyor chains 17 are pivotally connected near the bottom of the side walls 23 of the trough 21, as viewed during the working run, rather than substantially along their middle transverse axis, as in the case of the structure of Figs. 3, 4 and 6. In addition, I have illustrated rollers 129 which are without flanges. Also, the return or bottom run, as illustrated in Fig. 7 of the drawings, is illustrated as a working run, as it is provided with a bottom plate 120 which co-operates with the articulated side walls 23 to provide a conveyor trough. In such an arrangement, the bottom plate 120 will be discontinued before reaching the foot section 11 to provide for discharging material from the bottom run.

Except for the differences above pointed out, or other obvious differences, it is to be understood that the structure of the conveyor mechanism of Figs. 5 and 7 follows that of Figs. 3, 4 and 6.

Diagrammatically illustrated in Fig. 1 of the drawings and illustrated in detail in Fig. 2 of the drawings, is a further modification of the conveyor mechanism which follows that previously described, except for obvious differences and which differs principally in the fact that it provides a multiple compartment trough or a plural or multiple troughway, so that a plurality of materials may be simultaneously conveyed by the conveyor, while maintaining them separated during their travel. This multiple compartment conveyor includes a pair of laterally spaced articulated side plates or walls 123, each of which is formed by pairs of articulated overlapping upwardly and longitudinally extending outer and inner side plates 124 and 125, respectively.

The side plates 124 and 125 also preferably form side plates or side straps of the chains 17, as above described in connection with the conveyor of Figs. 3, 4 and 6. These plates 124 and 125 are pivotally connected together by pivot pins 28 of the chains 17 to provide for their articulation on horizontal axes. Laterally opposite or aligned plates 124 and 125, respectively, are connected by transversely extending flights 126.

Instead of a single trough 21, the conveyor of Figs. 1 and 2 provides a plurality of parallel troughways or compartments 121 and 221. To provide for the formation of the two separate troughways or compartments 121 and 221, each of the transverse flights 126 has rigidly connected thereto a forwardly extending partition plate 32; the partition plates 32 being in alignment down the center of the conveyor and preferably substantially midway between the ends of the flights 126. They also preferably have the same vertical dimension as the flights 126 and the side plates 124 and 125, which are also equal in height.

The forward end of each partition plate 32 is loosely received and thus free to move with respect to a pair of laterally spaced rearwardly extending angles 33, which are rigidly connected to the rear face of each flight 126, the sides of which angles 33 overlap the forward edge of each partition plate 32. The leading edge of each partition plate 32 is preferably pointed or beveled, as clearly illustrated in Fig. 2 of the drawings, so as to provide for the articulating character of the troughways 121 and 221, while at all times insuring separation between said two troughways for various articulated positions of the complete conveyor mechanism.

In the operation of the device, for example, as illustrated in the single troughway compartment, as embodied in the structure of Figs. 3, 4 and 5, material will be delivered to the trough between the side plates 23 at some point adjacent the foot section 11. The conveyor mechanism, including the chains 17, will be driven in the direction of the arrows, as seen in Figs. 1 and 4 of the drawings. This will cause the chains 17, articulated side walls 23 and flights 26 to move forwardly and guide the material in the trough 21 over the stationary bottom plate 20 until it is discharged over the forward end of said plate in the head section 10. The driving will be effected from the driven shaft 15 through the gearing 14, shaft 13 and sprockets 16, which mesh with the chains 17.

During this conveying operation, it is to be noted that there will be no substantial sliding friction between the material and the articulated side walls 23, since said side walls travel with the material. The only portion of the conveyor which is thus subject to any substantial friction is the bottom member or plate 20. This bottom member is subject to easy removal and renewal upon becoming worn. Furthermore, since it is substantially only a flat plate, it is relatively inexpensive and easy to replace in the conveyor.

As the material is conveyed along, as above described, there will be substantially no frictional contact between the bottoms of the plates 24 and 25 and the plate 20, particularly in the preferred forms of my invention, since said plates 24 and 25 are supported above the bottom plate 20. If desired, however, the rollers 29 or other supporting mechanism, may be eliminated, and in a broader aspect of the invention, the side walls 23 may be permitted to slide directly on the bottom member of plate 20.

Furthermore, since the bottom member or plate 20 extends laterally beyond the edges of the plates 23, should material tend to flow under said plates or walls 23, it will tend to build up and form its own seal. If desired, this sealing action may be augmented by providing the baffle plates 31 on the bottom members or plates 20.

The operation of the apparatus of Figs. 5 and 7 is substantially the same as that above described, the differences being largely in structural details, which have heretofore been pointed out.

Likewise, the operation of the conveyor of Figs. 1 and 2 is substantially the same as that above described, except for one important distinction which is that it provides a plural or multiple troughway conveyor whereby different materials may be conveyed and maintained separate.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A conveyor including a trough having a bottom, a pair of laterally spaced endless conveyor chains movable over said bottom, and roll and rail means for supporting said chains for rectilinear movement, said chains including links having interior side bar plates of a height considerably greater than their exterior side bar plates to provide the material retaining side walls of said conveyor and co-operating with said bottom to form the material holding and conveying trough thereof, flights extending between said side walls, said roll and rail means co-operating to support the bottoms of said side walls off but close to said bottom.

2. A conveyor including a trough having a bottom, a pair of laterally spaced endless conveyor chains movable over said bottom, said chains including links of parallel laterally spaced side bar plates, the interior side bar plates having a height considerably greater than their exterior side bar plates to provide the material retaining side walls of said conveyor and co-operating with said bottom to form the material holding and conveying trough thereof, and transverse flights extending between said interior side bar plates.

3. A conveyor including a trough having a bottom, a pair of laterally spaced endless conveyor chains movable over said bottom, and means for supporting said chains for rectilinear movement, said chains including links of parallel laterally spaced side bar plates, the interior side bar plates having a height considerably greater than the exterior side bar plates to provide the material retaining side walls of said conveyor and co-operating with said bottom to form the material holding and conveying trough thereof, flights extending between said interior side bar plates, said means co-operating to support the bottoms of said side walls off but close to said bottom.

4. A conveyor including a pair of laterally spaced endless chains each formed of a plurality of pivotally connected links, said chains having rail engaging supporting rolls, said links including a pair of laterally spaced upright side bars connected adjacent opposite ends by pins which also connect adjacent links and carry said rolls, a material receiving trough having a stationary bottom and laterally spaced upstanding side members having a height substantially greater than the height of the outside chain side bars, said side members of said trough forming at least part of the inner side bars of said pair of chains and being attached to other parts of said chains to travel therewith, flights extending laterally between said side members and connected thereto, and means for conveying said chains and side members over said stationary bottom to carry material along with said trough side members and in sliding relation with the trough bottom.

5. A conveyor including a pair of laterally spaced endless chains each formed of a plurality of pivotally connected links, said links including a pair of laterally spaced upright side bars connected adjacent opposite ends by pins which also connect adjacent links, a material receiving trough having a stationary bottom and laterally spaced upstanding side members having a height substantially greater than the height of the outside chain side bars, said side members of said trough forming at least part of the inner side bars of said pair of chains and being attached to other parts of said chains to travel therewith, flights extending laterally between said side members and connected thereto, and means for conveying said chains and side members over said stationary bottom to carry material along with said trough side members and in sliding relation with the trough bottom.

6. A conveyor including a pair of laterally spaced endless chains each formed of a plurality of pivotally connected links, said links including a pair of laterally spaced upright side bars connected adjacent opposite ends by pins which also connect adjacent links, a material receiving trough having a stationary bottom and laterally spaced upstanding side members having a height substantially greater than the height of the outside chain side bars and being attached to parts of said chains to travel therewith, flights extending laterally between said side members and connected thereto, and means for conveying said chains and side members over said stationary bottom to carry material along with said trough side members and in sliding relation with the trough bottom.

7. A conveyor including a pair of laterally spaced endless chains each formed of a plurality of pivotally connected links, said links including a pair of laterally spaced upright side bars connected adjacent opposite ends by pins which also connect adjacent links, a material receiving trough having a stationary bottom and laterally spaced upstanding side members having a height substantially greater than the height of the outside chain side bars, said side members of said trough forming the inner side bars of said pair of chains and being attached to other parts of said chains to travel therewith, flights extending laterally between said side members and connected thereto, and means for conveying said chains and side members over said stationary bottom to carry material along with said trough side members and in sliding relation with the trough bottom.

8. A conveyor including a pair of laterally spaced endless chains each formed of a plurality of pivotally connected links, said chains having rail engaging supporting rolls, said links including a pair of laterally spaced upright side bars connected adjacent opposite ends by pins which also connect adjacent links and carry said rolls, a material receiving trough having a stationary bottom and laterally spaced upstanding side members having a height substantially greater than the height of the outside chain side bars, said side members of said trough forming the inner side bars of said pair of chains and being attached to other parts of said chains to travel therewith, flights extending laterally between said side members and connected thereto, and means for conveying said chains and side members over said stationary bottom to carry material along with said trough side members and in sliding relation with the trough bottom.

9. In a conveyor, the combination with a pair of laterally spaced chains each including interconnected links, said chains having rail engaging supporting rolls, said links including a pair of laterally spaced upright side bars connected adjacent opposite ends by pins which pivotally attach adjacent links and carry said supporting rolls, a material receiving trough including a stationary bottom and at least three laterally spaced upstanding trough members all having a height substantially greater than the height of the outside chain side bars, the two outside trough members forming at least part of the inner side bars of said pair of chains, flights extending laterally between and interconnecting said laterally spaced trough members, and means for conveying said chains and trough members over said stationary bottom to carry material along with said trough members and in sliding relation with the trough bottom.

10. In a conveyor, the combination with a pair of laterally spaced chains each including interconnected links, said links including a pair of laterally spaced upright side bars connected adjacent opposite ends by pins which pivotally attach adjacent links, a material receiving trough including a stationary bottom and at least three laterally spaced upstanding trough members all having a height substantially greater than the height of the outside chain side bars, the two outside trough members forming at least part of the inner side bars of said pair of chains, flights extending laterally between and interconnecting said laterally spaced trough members, and means for conveying said chains and trough members over said stationary bottom to carry material along with said trough members and in sliding relation with the trough bottom.

11. In a conveyor, the combination with a pair of laterally spaced chains each including interconnected links, said links including a pair of laterally spaced upright side bars connected adjacent opposite ends by pins which pivotally attach adjacent links, a material receiving trough including a stationary bottom and at least three laterally spaced upstanding trough members all having a height substantially greater than the height of the outside chain side bars, flights extending laterally between and interconnecting said laterally spaced trough members, and means for conveying said chains and trough members over said stationary bottom to carry material along with said trough members and in sliding relation with the trough bottom.

12. In a conveyor, the combination with a pair of laterally spaced chains each including interconnected links, said links including a pair of laterally spaced upright side bars connected adjacent opposite ends by pins which pivotally attach adjacent links, a material receiving trough including a stationary bottom and at least three laterally spaced upstanding trough members all having a height substantially greater than the height of the outside chain side bars, the two outside trough members forming the inner side bars of said pair of chains, flights extending laterally between and interconnecting said laterally spaced trough members, and means for conveying said chains and trough members over said stationary bottom to carry material along with said trough members and in sliding relation with the trough bottom.

13. In a conveyor, the combination with a pair of laterally spaced chains each including interconnected links, said chains having rail engaging supporting rolls, said links including a pair of laterally spaced upright side bars connected adjacent opposite ends by pins which pivotally attach adjacent links and carry said supporting rolls, a material receiving trough including a stationary bottom and at least three laterally spaced upstanding trough members all having a height substantially greater than the height of the outside chain side bars, the two outside trough members forming the inner side bars of said pair of chains, flights extending laterally between and interconnecting said laterally spaced trough members, and means for conveying said chains and trough members over said stationary bottom to carry material along with said trough members and in sliding relation with the trough bottom.

WILBUR R. DICKSON.